United States Patent
Wang et al.

(10) Patent No.: US 12,418,352 B1
(45) Date of Patent: Sep. 16, 2025

(54) MULTI-ROOM MULTI-CHANNEL AUDIO SYNCHRONIZATION METHOD, APPARATUS, AND DEVICE AND STORAGE MEDIUM

(71) Applicant: Linkplay Technology Inc., Newark, CA (US)

(72) Inventors: Huaijing Wang, Newark, CA (US); Lifeng Zhao, Newark, CA (US)

(73) Assignee: Linkplay Technology Inc.

( * ) Notice: Subject to any disclaimer, the term of this patent is extended or adjusted under 35 U.S.C. 154(b) by 0 days.

(21) Appl. No.: 19/192,413

(22) Filed: Apr. 29, 2025

(30) Foreign Application Priority Data

Dec. 27, 2024 (CN) .......................... 202411943085.7

(51) Int. Cl.
  *H04J 3/06* (2006.01)
  *G10L 19/008* (2013.01)
(52) U.S. Cl.
  CPC .......... *H04J 3/0667* (2013.01); *H04J 3/0638* (2013.01); *H04J 3/0658* (2013.01); *H04J 3/0682* (2013.01)
(58) Field of Classification Search
  CPC .... H04N 21/242; H04J 3/0682; H04J 3/0667; H04J 3/0658; H04J 3/0638
  See application file for complete search history.

(56) References Cited

U.S. PATENT DOCUMENTS

| | | | | |
|---|---|---|---|---|
| 10,555,082 B2 * | 2/2020 | Kallai | ...................... | H04R 3/12 |
| 11,974,338 B2 * | 4/2024 | Iyer | ...................... | H04W 76/14 |
| 12,020,719 B2 * | 6/2024 | Bouvigne | .......... | H04N 21/4305 |
| 2006/0274747 A1* | 12/2006 | Duchscher | ............ | H04L 65/613 |
| | | | | 370/389 |
| 2020/0162852 A1 | 5/2020 | Xu | | |

FOREIGN PATENT DOCUMENTS

| | | |
|---|---|---|
| CN | 1411679 A | 4/2003 |
| CN | 101233786 A | 7/2008 |
| CN | 108885879 A | 11/2018 |
| CN | 118210470 A | 6/2024 |
| CN | 118870502 A | 10/2024 |

OTHER PUBLICATIONS

Jian et al., "Point-to-Multipoint stereo audio transmitting system based on Bluetooth", International Conference on Communications and Mobile Computing, 2010 (Year: 2010).*
Rautiainen, et al., "Swarm Synchronization for Multi-Recipient Multimedia Streaming", IEEE, ICME, 2009 (Year: 2009).*
Chisaki, et al., "Network-based multi-channel signal processing using the precision time protocol", IEEE, 2012 (Year: 2012).*

\* cited by examiner

Primary Examiner — Omer S Mian
(74) Attorney, Agent, or Firm — Bayramoglu Law Offices LLC

(57) ABSTRACT

A multi-room multi-channel audio synchronization method, apparatus, and device and a storage medium are provided. In this method, an audio signal to be played in a primary audio device is determined, the audio signal is encoded according to channels by using a preset low-latency audio encoding strategy and audio encoding data is obtained. Next, the audio encoding data is optimized based on a User Datagram Protocol and a Negative Acknowledgment NACK retransmission mechanism to obtain audio coded sequence data packets. The audio encoding sequence data packets are controlled to be synchronously played in at least one secondary audio device by using a preset room synchronization control strategy and a channel synchronization control strategy.

14 Claims, 4 Drawing Sheets

MULTI-ROOM MULTI-CHANNEL AUDIO SYNCHRONIZATION METHOD, APPARATUS, AND DEVICE AND STORAGE MEDIUM

CROSS-REFERENCE TO THE RELATED APPLICATIONS

This application is based upon and claims priority to Chinese Patent Application No. 202411943085.7, filed on Dec. 27, 2024, the entire contents of which are incorporated herein by reference.

TECHNICAL FIELD

This application relates to the field of audio processing technology, in particular to a multi-room multi-channel audio synchronization method, apparatus, and device and a storage medium.

BACKGROUND

In the field of real-time audio communication, particularly in a multi-room and multi-channel audio system, connections can be made using either wireless or wired manners. With the development of wireless technology, wireless audio devices in the system have become a trend, as the wireless manners simplify the wiring.

Currently, in order to ensure the synchronization of an audio signal between wireless audio devices, such audio encoding technologies as Advanced Audio Codec (AAC) and MPEG-1 or MPEG-2 Audio Layer III (MP3), along with a Transmission Control Protocol (TCP) protocol, are used to reduce transmission latency. Although these encoding technologies perform well in terms of compression rate, their encoding and decoding processes require a certain amount of accumulated audio frames to process, resulting in higher algorithm delay. Similarly, while the TCP protocol can ensure the reliability of data transmission, its congestion control and retransmission mechanisms can lead to significant increases in latency when the network is unstable. As a result, the current audio synchronization solutions still face issues of high audio delay and poor synchronization.

SUMMARY

In a first aspect, this application provides a multi-room multi-channel audio synchronization method, including: determining an audio signal to be played in a primary audio device, encoding the audio signal according to channels by using a preset low-latency audio encoding strategy and obtaining audio encoding data; optimizing, based on a user datagram protocol (UDP) and a negative acknowledgment (NACK) retransmission mechanism, the audio encoding data to obtain audio coded sequence data packets; and controlling the audio encoding sequence data packets to be synchronously played in at least one secondary audio device by using a preset room synchronization control strategy and a channel synchronization control strategy; where the room synchronization control strategy is a synchronization strategy for clock synchronization of multiple audio devices based on a distributed clock synchronization mechanism and for clock synchronization between the primary audio device and at least one secondary audio device based on a precision time protocol (PTP); where the channel synchronization control strategy is a synchronization strategy for dynamically allocating audio transmission of each channel based on channel grouping.

In one possible embodiment, encoding the audio signal according to channels by using the preset low-latency audio encoding strategy, and obtaining the audio coding data, includes:
  determining encoding parameters from the preset low-latency audio encoding strategy, where the encoding parameters include a frame length, a bit rate, and a sampling rate;
  separating the audio spectrum of each channel of the audio signal by using an audio processing tool, and obtaining the plurality of channel audios; and
  encoding, by using a Low Complexity Communications Codec LC3 encoder and parallel sub-frame processing mechanism, each channel audio according to the frame length, the bit rate, and the sampling rate, to obtain the audio coding data corresponding to the audio signal.

In one possible embodiment, encoding, by using the LC3 encoder and the parallel sub-frame processing mechanism, each channel audio according to the frame length, the bit rate, and the sampling rate, to obtain the audio coding data corresponding to the audio signal, includes:
  performing frame-dividing processing on each channel audio based on the bit rate, the frame length, and the sampling rate to obtain the plurality of audio frame signals, where each of the audio frame signals has a length equal to the frame length and includes N sampling points, and the N sampling points are calculated based on the sampling rate; and
  controlling the LC3 encoder by using the parallel sub-frame processing mechanism to encode each of the audio frame signals and concatenate the audio frame signals, to obtain the audio coding data corresponding to the audio signal.

In one possible embodiment, the multi-room multi-channel audio synchronization method further includes:
  subsequent to determining the audio signal to be played in the primary audio device, and prior to encoding the audio signal according to channels by using the preset low-latency audio encoding strategy and obtaining the audio coding data, performing noise suppression on the audio signal by using an adaptive noise suppression algorithm;
  performing acoustic echo cancellation on the printed audio signal by using an adaptive filtering algorithm; and
  performing normalization processing on the audio signal after the acoustic echo cancellation, and outputting the audio signal.

In one possible embodiment, optimizing, based on the UDP and the NACK retransmission mechanism, the audio encoding data to obtain the audio coded sequence data packets includes:
  adding, based on a packet format defined in the UDP, a packet header with a unique identifier to the audio encoding data of each of the audio frame signals, where the packet header includes a sequence number of a frame, timestamp, and a redundancy flag;
  calculating, by using the NACK retransmission mechanism and the sequence number, a maximum quantity of retransmissions of a corresponding audio frame signal, and adding the maximum quantity of retransmissions and the NACK response flag to the audio encoding data of the audio frame signal; and sorting the audio frame signals into which the packet header, the maximum quantity of retransmissions, and the NACK response flag are added, in chronological order to obtain the audio encoding sequence data packets.

In one possible embodiment, controlling the audio encoding sequence data packets to be synchronously played in at least one secondary audio device by using the preset room synchronization control strategy and the channel synchronization control strategy, includes:

determining the primary audio device through mutually voting using an election mechanism, and controlling the primary audio device to send a synchronization instruction to a plurality of secondary audio devices, where the synchronization instruction includes timestamp information, and the timestamp information includes a sending time of the primary audio device and a receiving time at each secondary audio device;

calculating a clock difference of each channel between the primary audio device and each secondary audio device based on a response returned by each secondary audio device according to the synchronization instruction; and playing the audio encoding sequence data packets in the corresponding secondary audio device based on a clock difference planning of each channel.

In one possible embodiment, playing the audio encoding sequence data packets in the corresponding secondary audio device based on the clock difference planning of each channel, includes:

adjusting, based on the clock difference of each channel, the bandwidth resource of each channel according to the priority allocation strategy of bandwidth resource; and sending the audio encoding sequence data packets to the corresponding secondary audio device for playback based on the adjusted bandwidth resource.

In one possible embodiment, adjusting, based on the clock difference of each channel, the bandwidth resource of each channel according to the priority allocation strategy of bandwidth resource, includes:

sorting, according to sizes of clock differences of the channels, the channels of each secondary audio device; where the channels include a front channel, a surrounding channel, and a bass channel;

calculating, according to a priority of bandwidth resource usage for each channel and the channel sorting, a weighted coefficient for each channel; and calculating, based on the weighted coefficient and a bandwidth allocation bit rate formula, the bandwidth resource of each channel; where the front channel and the bass channel have the highest priority.

In one possible embodiment, playing the audio encoding sequence data packets in the corresponding secondary audio device based on the clock difference planning of each channel, includes:

calculating, based on the clock difference of each channel, a size of buffered audio in the corresponding secondary audio device;

setting, based on the size of the buffered audio, a corresponding buffer; and monitoring a state of the buffer where the audio encoding sequence data packets are stored, and after the buffer is completely occupied by the audio encoding sequence data packets, controlling the corresponding secondary audio device to play the audio encoding sequence data packets.

In one possible embodiment, setting, based on the size of the buffered audio, the corresponding buffer, includes:

calculating, using a latency compensation algorithm, a size of the corresponding buffer based on the size of the buffered audio, where the size of the buffer is:

$B_2=B_1+r^*\Delta T$ where $B_2$ is a size of the buffer after adjustment, $B_1$ is the current size of the buffer, $\Delta T$ is the clock difference, and r is an adjustment coefficient of the buffer.

In one possible embodiment, the multi-room multi-channel audio synchronization method further includes:

subsequent to controlling the audio encoding sequence data packets to be synchronously played in at least one secondary audio device by using the preset room synchronization control strategy and the channel synchronization control strategy, detecting whether a NACK response message exists;

determining a target secondary audio device based on the NACK response message in response to determining that the NACK response message exists, and polling and transmitting the audio encoding sequence data packets to the target secondary audio device according to the maximum quantity of retransmissions.

In a second aspect, this application provides a multi-room multi-channel audio synchronization apparatus, including: an encoding module, configured to determine an audio signal to be played in a primary audio device, and encode the audio signal according to channels by using a preset low-latency audio encoding strategy and obtaining audio encoding data; an optimization module, configured to optimize, based on a User Datagram Protocol UDP and a Negative Acknowledgment NACK retransmission mechanism, the audio encoding data to obtain audio coded sequence data packets; and a transmission module, configured to control the audio encoding sequence data packets to be synchronously played in at least one secondary audio device by using a preset room synchronization control strategy and a channel synchronization control strategy; where the room synchronization control strategy is a synchronization strategy for clock synchronization of multiple audio devices based on a distributed clock synchronization mechanism and for clock synchronization between the primary audio device and at least one secondary audio device based on a Precision Time Protocol PTP; where the channel synchronization control strategy is a synchronization strategy for dynamically allocating audio transmission of each channel based on channel grouping.

In a third aspect, this application provides an audio device, including: a memory and at least one processor, where the memory has stored thereon instructions, and the at least one processor calling the instructions in the memory, enables the audio device to perform the above-mentioned multi-room multi-channel audio synchronization method.

In a fourth aspect, this application provides a computer readable storage medium having instructions stored thereon, the instructions implementing, when executed by a processor, the above-mentioned multi-room multi-channel audio synchronization method.

DETAILED DESCRIPTION OF THE EMBODIMENTS

The embodiment of this application provides a multi-room multi-channel audio synchronization method, apparatus, and device, and a storage medium. By using low-latency LC3 encoding as the audio encoding approach, it can significantly reduce encoding and decoding latency as compared with the traditional encoding approach. Furthermore, based on the reliable transmission mechanism of UDP and optimized retransmission algorithm, it minimizes transmission delay while ensuring reliability. In addition, through the audio synchronization optimization strategy based on multi-room and multi-channel scenarios, it achieves millisecond-level audio synchronization among devices. In multi-channel application scenarios, through an innovative distributed clock synchronization and dynamic delay compensation mechanism, it ensures precise synchronization of each channel signal, providing reliable support for wireless home theater systems.

Terms such as "first", "second", "third" and "fourth" (if any) in the description, claims and the drawings of this application are used to differentiate similar objects, and not necessarily used to describe a specific sequence or order. It should be appreciated that the data used in this way may be interchanged under an appropriate circumstance, so that the embodiments of this application described herein may be implemented in a sequence other than those illustrated or described herein. Moreover, terms "include", "have" and any other variation thereof are intended to encompass non-exclusive inclusion, such that a process, method, system, product or device including a series of steps or units includes not only those steps or elements, but also other steps or units not explicitly listed, or steps or units inherent in the process, method, system, product or device.

As can be appreciated, an entity for performing this application may be a multi-room multi-channel audio synchronization apparatus, or a terminal, or an audio playback software, or a server, which will not be particularly defined herein. The embodiments of this application are illustrated with the server as the entity, which is a server located in a local area network, and the server has control software installed that can achieve audio playback in multiple rooms, such as a certain music software. In this application, the server is used as a primary audio device (which is located in one of the rooms), while other rooms or audio devices serve as the secondary audio devices.

Figure 1:
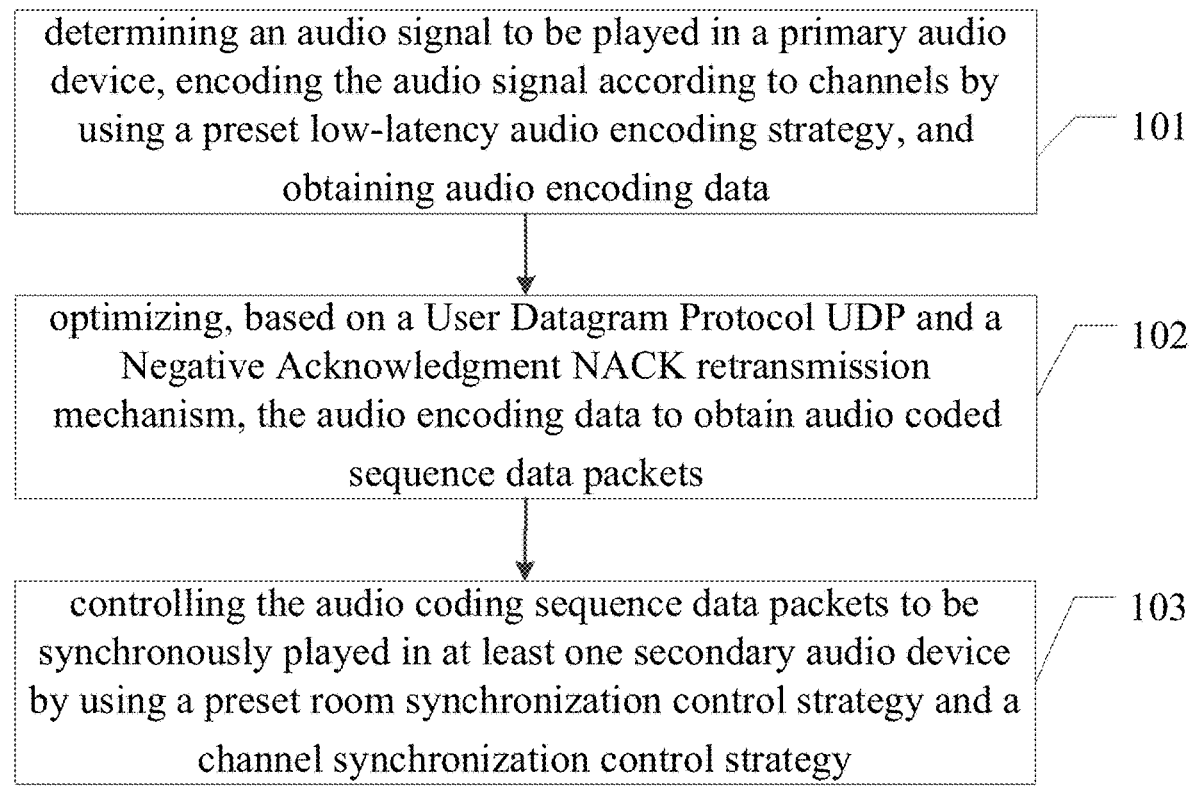
FIG. 1 is a schematic diagram of a multi-room multi-channel audio synchronization method according to the embodiments of this application.

To facilitate understanding, the specific process of the embodiments of this application will be described below. Please refer to FIG. 1, the multi-room multi-channel audio synchronization method according to the embodiments of this application, including the following steps.

Step 101, determining an audio signal to be played in a primary audio device, encoding the audio signal according to channels by using a preset low-latency audio encoding strategy, and obtaining audio encoding data.

In this embodiment, when the server obtains the current audio signal to be played, it may be audio outputted from the server's own music software, or audio transmitted to the server when such devices as smartphones or iPads of a user are connected to audio software/platforms of the server. The format of this audio may be an advanced multi-channel format such as Dolby AC-3, DTS-HD Master Audio, Dolby TrueHD, or Atmos.

As can be appreciated, the server is used as a primary audio device, and speakers in rooms serve as secondary audio devices. A controller in the server detects whether an audio playback function is triggered, e.g., a single audio signal for simultaneous playback in multiple rooms.

After determining the audio signal to be played, the audio signal is encoded. It should be noted that the encoding herein is performed using a low-latency encoding method, such as the LC3 encoder. Furthermore, a parallel frame approach may be used in conjunction with the LC3 encoder to further reduce encoding latency.

In specific, encoding parameters are determined from the preset low-latency audio encoding strategy, where the encoding parameters include a frame length, a bit rate, and a sampling rate. The audio spectrum of each channel of the audio signal is separated by using an audio processing tool, and the plurality of channel audios is obtained. Each channel audio is encoded by using a Low Complexity Communications Codec LC3 encoder and parallel sub-frame processing mechanism according to the frame length, the bit rate, and the sampling rate, to obtain the audio encoding data corresponding to the audio signal.

As can be appreciated, by analyzing the low-latency audio encoding strategy, the frame length, the bit rate and the sampling rate are obtained, while the specific values of the frame length, the bit rate and the sampling rate are determined based on the user's playback sound effects on each secondary audio device. Specifically, the frame length is determined according to the playback sound effects and the parameters of the encoder, and the frame length is typically short in order to reduce encoding and decoding latency, e.g., ranging between 10 ms and 30 ms.

The bit rate is determined based on the playback sound effects and a compression level of the audio data by the encoder, e.g., calculated by balancing the audio quality and the transmission bandwidth.

The sampling rate is determined based on a frequency resolution of the audio signal. For example, the sampling rate is 44.1 kHz, 48 kHz, 16 kHz, or the like.

For separating the audio spectrum of each channel, an audio processing tool (such as Fast Fourier Transform FFT) is used to separate the audio spectrum of the audio signal for each channel.

The formula is as follows:

$$X[k] = \sum_{n=0}^{N-1} x[n] * e^{-j\frac{2\pi}{N}kn},$$

where x[n] is an input signal, X[k] is a frequency domain signal, and N is the number of FFT points.

When encoding using the LC3 encoder and the parallel sub-frame processing mechanism, the LC3 encoder is first initialized, and the frame length, the bit rate, and the sampling rate are set. Next, the audio of each channel is divided into a plurality of sub-frames according to the frame length, and each sub-frame is encoded using the LC3 encoder. Lastly, the encoded data of all sub-frames is combined to form the final audio encoded data. During the parallel sub-frame processing, the audio frame is first divided into a plurality of sub-frames, and multi-threading or parallel computing framework (such as OpenMP or CUDA) are used to process the sub-frames in parallel. Lastly, the encoded data after the parallel processing is combined together.

Step 102, optimizing, based on a User Datagram Protocol UDP and a Negative Acknowledgment NACK retransmission mechanism, the audio encoding data to obtain audio coded sequence data packets.

In this embodiment, a size of each data packet is usually depends on such factors as network bandwidth, latency, and jitter. The audio encoded data is segmented according to the size of each data packet, with each packet including a portion of the audio encoded data. Header information is added to each data packet, including sequence number, timestamp, and packet size, among others. Furthermore, checksum or a cyclic redundancy check field may also be added for error detection.

Step 103, controlling the audio encoding sequence data packets to be synchronously played in at least one secondary audio device by using a preset room synchronization control strategy and a channel synchronization control strategy.

It should be appreciated that the room synchronization control strategy is a synchronization strategy for clock synchronization of multiple audio devices based on a distributed clock synchronization mechanism and for clock synchronization between the primary audio device and at least one secondary audio device based on a Precision Time Protocol PTP, and the channel synchronization control strategy is a synchronization strategy for dynamically allocating audio transmission of each channel based on channel grouping.

This step actually includes three parts: clock synchronization, channel grouping and dynamic allocation, and audio playback synchronization, where the clock synchronization is achieved through the room synchronization control strategy, and channel grouping and dynamic allocation is achieved through the channel synchronization control strategy.

When clock synchronization is achieved through the room synchronization control strategy, it includes: clock synchronization of multiple audio devices based on a distributed clock synchronization mechanism and clock synchronization between the primary audio device and at least one secondary audio device based on a Precision Time Protocol PTP.

It should be noted that the clock synchronization of multiple audio devices based on the distributed clock synchronization mechanism includes:
  implementing network Time Protocol (NTP) or similar distributed clock synchronization mechanism on each audio device; each audio device regularly sending a time request to a time server in the network and receiving a response from the time server; adjusting the local clock of the audio device according to the response of the time server to achieve clock synchronization between multiple audio devices; monitoring clock drift and periodically performing clock correction to maintain the synchronization precise.

The clock synchronization between the primary audio device and the secondary audio device based on the PTP includes: configuring a primary clock of PTP on the primary audio device; configuring a secondary clock of PTP on the secondary audio device and setting its primary clock to the configured primary audio device; where the PTP achieves time synchronization by exchanging a synchronization message (Sync), a follow-up message (Follow Up), a delay request message (Delay_Req), and a delay response message (Delay_Resp); the secondary audio device calculating its clock difference relative to the primary audio device based on the received synchronization message and adjusts its local clock to match the clock of the primary audio device; and monitoring a PTP synchronization state and performing re-synchronization when necessary.

The channel grouping and dynamic allocation achieved through the channel synchronization control strategy includes: according to the channel configuration (e.g., stereo, surrounding sound, etc.) of the audio content, dividing the channels into different groups; assigning a unique identifier (ID) and a corresponding audio sending channel to each channel group; generating, on the primary audio device, audio sending tasks based on the channel grouping and dynamic allocation strategy, where each audio sending task includes the audio data to be sent, a target channel group, sending timestamp, and etc.; the audio device calculating the precise sending time for each audio transmission task based on a clock synchronization result and assigning one audio sending task to a corresponding secondary audio device; after receiving the audio sending task, the secondary audio device playing the audio data at the specified time based on the local clock and synchronization information; and monitoring an audio playback synchronization state, and in a case that any synchronization issues (such as delay, jitter, etc.) are detected, performing adjustment according to a synchronization control algorithm, such as increasing the size of the buffer or adjusting the sending time.

After completing the above synchronization and allocation, a playback task list is generated on the primary audio device according to a playback sequence and timeline of the audio content, where the playback task list includes information such as playback time, duration, and channel group for each audio segment; the primary audio device calculates the precise playback time for each audio segment based on the clock synchronization results and the playback task list, and sends the playback instruction to the secondary audio devices; after receiving the playback instruction, the secondary audio devices start playing the audio segment at the specified time based on the local clock and synchronization information.

In the embodiments of this application, the audio signal is encoded by using low-latency LC3 encoding to minimize transmission delay, and the encoded audio signal is transmitted by using the UDP protocol and NACK retransmission mechanism, which reduces network bandwidth occupancy while avoiding additional delays caused by transmission or retransmission.

Figure 2:
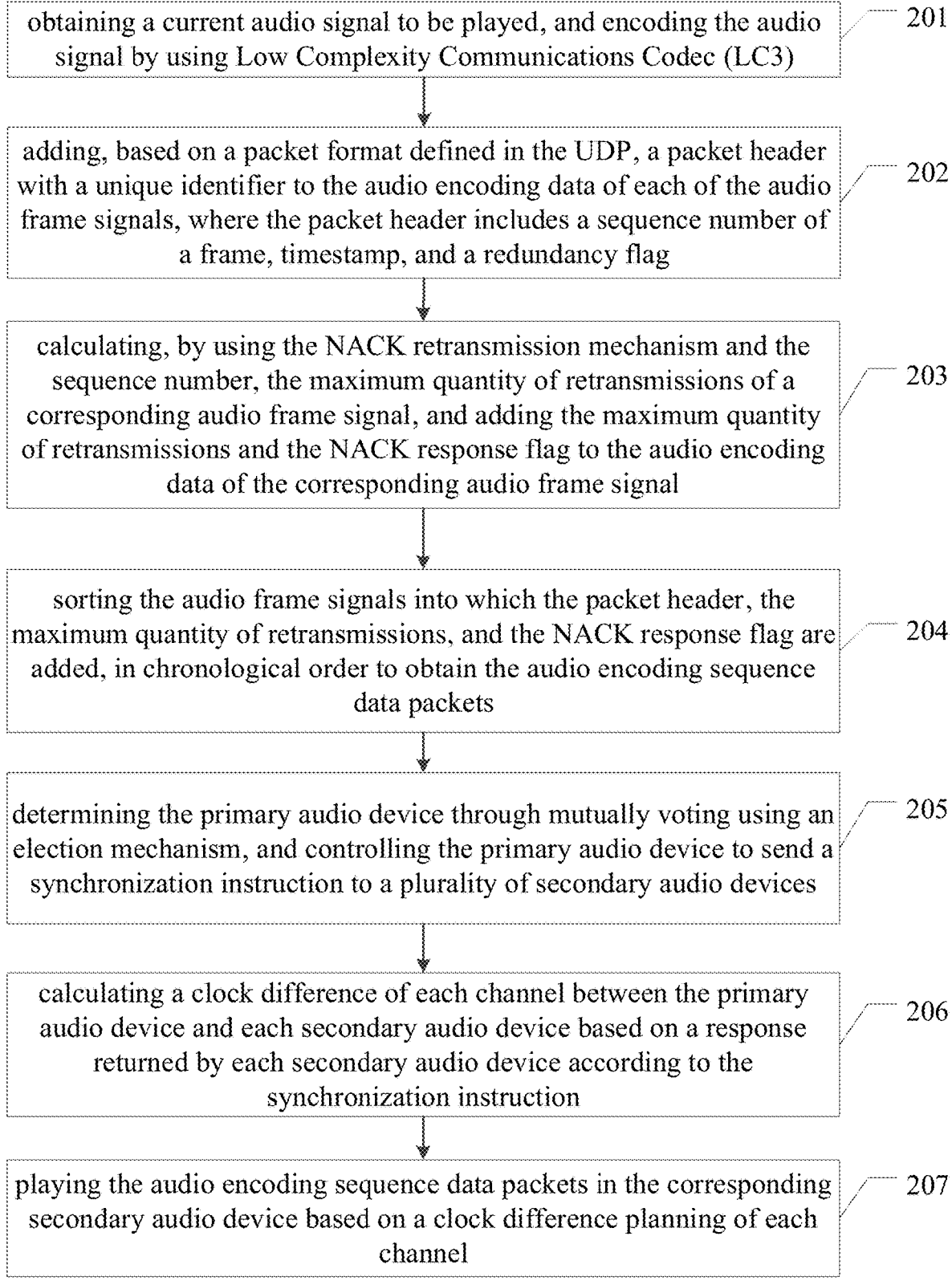
FIG. 2 is another schematic diagram of the multi-room multi-channel audio synchronization method according to the embodiments of this application.

Please refer to FIG. 2, the multi-room multi-channel audio synchronization method according to the embodiments of this application, including the following steps.

Step 201, obtaining a current audio signal to be played, and encoding the audio signal by using Low Complexity Communications Codec (LC3).

In this step, encoding parameters are determined from a preset low-latency audio encoding strategy, where the encoding parameters include a frame length, a bit rate, and a sampling rate. Next, the audio spectrum of each channel of the audio signal is separated by using an audio processing tool, and the plurality of channel audios is obtained. Each channel audio is encoded by using a Low Complexity Communications Codec LC3 encoder and parallel sub-frame processing mechanism according to the frame length, the bit rate, and the sampling rate, to obtain audio encoding data corresponding to the audio signal.

It should be noted that the encoding process is as follows: performing frame-dividing processing on each channel audio based on the bit rate, the frame length, and the sampling rate to obtain the plurality of audio frame signals, where each of the audio frame signals has a length equal to the frame length and includes N sampling points, and the N sampling points are calculated based on the sampling rate; and controlling the LC3 encoder by using the parallel sub-frame processing mechanism to encode each of the audio frame signals and concatenate the audio frame signals, to obtain the audio coding data corresponding to the audio signal.

In another possible embodiment, subsequent to determining the audio signal to be played in the primary audio device, and prior to encoding the audio signal according to channels by using the preset low-latency audio encoding strategy and obtaining the audio coding data, the method further includes: performing noise suppression on the audio signal by using an adaptive noise suppression algorithm, performing acoustic echo cancellation on the printed audio signal by using an adaptive filtering algorithm, and performing normalization processing on the audio signal after the acoustic echo cancellation, and outputting the audio signal.

The controlling the LC3 encoder by using the parallel sub-frame processing mechanism to encode each of the audio frame signals and concatenate the audio frame signals, to obtain the audio coding data corresponding to the audio signal is specifically achieved as follows: collecting the audio signal with an audio collection device that has a sampling rate of 48 kHz; performing noise suppression, acoustic echo cancellation, and automatic gain control on the collected audio signal to ensure the quality of the audio signal; dividing the audio signal into ultra-short frames of 2.5 ms, with each frame including 120 sampling points; converting the audio signal in each frame into a frequency domain signal through Fast Fourier Transform (FFT), and performing quantization and compression, using Huffman coding for data compression processing.

In another possible embodiment, controlling the LC3 encoder by using the parallel sub-frame processing mechanism to encode each of the audio frame signals and concatenate the audio frame signals, to obtain the audio coding data corresponding to the audio signal is specifically achieved as follows.

First, an input audio frame signal is divided. Specifically, the audio frame signal $x[n]$ is sampled and divided into 2.5 ms frames, with each frame including $N=48\times2.5=120$ sampling points.

Next, parallel processing is performed on the sub-frames. Specifically, each frame of data is divided into k sub-frames, with each sub-frame having a length of $M=N/k$, and the sub-frames are processed in parallel.

Last, a discrete Fourier transform (DFT) is performed. Specifically, the Fast Fourier Transform (FFT) is performed on each sub-frame using the formula: $X[k]=\Sigma_{n=0}^{M-1} x[n]*e M/j2\pi kn$, where k is the number of sub-frames.

Step 202, adding, based on a packet format defined in the UDP, a packet header with a unique identifier to the audio encoding data of each of the audio frame signals, where the packet header includes a sequence number of a frame, timestamp, and a redundancy flag.

Specifically, a new packet header is first generated for each of the audio frame signals and a field of the packet header is initialized. Next, a predefined packet header definition rule is called to determine the sequence number, timestamp, and redundancy flag. The sequence number may start from 0 and increment by 1 each time an audio frame signal is sent. The timestamp may be obtained using a high-precision timer (such as a Portable Operating System Interface POSIX clock_gettime function) to obtain the current timestamp. The redundancy flag is determined by parsing the content field of each audio frame signal to extract a frequency band without audio as redundant content. Last, the packet header is packaged together with the audio frame data to form a complete UDP packet. During subsequent synchronized playback, the packet header and audio frame data are extracted from the UDP packet, and reassembled and played back according to the sequence number and timestamp.

Step 203, calculating, by using the NACK retransmission mechanism and the sequence number, the maximum quantity of retransmissions of a corresponding audio frame signal, and adding the maximum quantity of retransmissions and the NACK response flag to the audio encoding data of the corresponding audio frame signal.

Step 204, sorting the audio frame signals into which the packet header, the maximum quantity of retransmissions, and the NACK response flag are added, in chronological order to obtain the audio encoding sequence data packets.

The NACK retransmission mechanism is used to send a NACK message requesting the retransmission of the lost data packet when a data packet loss or damage is detected.

The maximum quantity of retransmissions is a limit on the quantity of retransmissions for each data packet with a specific sequence number. When the quantity of retransmissions reaches the preset maximum quantity of retransmissions, the retransmission is stopped.

The NACK response flag is used to mark that a retransmission request for the audio encoding data is based on a NACK response, where a NACK message carrying the sequence number of the data packet for which retransmission is being requested is fed back, serving as the NACK response flag. Upon receiving the NACK message, a retransmission counter corresponding to data packet is updated based on the sequence number, and preparation for retransmission is made.

Step 205, determining the primary audio device through mutually voting using an election mechanism, and controlling the primary audio device to send a synchronization instruction to a plurality of secondary audio devices.

The synchronization instruction includes timestamp information, the timestamp information includes a sending time of the primary audio device and a receiving time at each secondary audio device In this embodiment, the audio devices in multiple rooms broadcast messages to each other. When one audio device receives broadcast messages from other audio devices that exceed half of the total number of rooms, this one audio device broadcasts its primary device identity and state information to the network. Other secondary devices, upon receiving the broadcast from the primary device, confirms the identity of the primary device and get ready to receive the synchronization instruction.

When sending the synchronization instruction, the primary device maintains a global timestamp to synchronize the playback time of all devices; the secondary devices regularly send time synchronization requests to the primary device to ensure that their local time remains consistent with the primary device's time.

When receiving a playback instruction, the primary device calculates a unified playback time based on the global timestamp. Next, the primary device sends a playback synchronization instruction to all secondary devices, including such key information as playback start time and playback duration. The secondary devices, upon receiving the synchronization instruction, adjust their playback time according to the synchronization instruction to ensure synchronization with the playback of the primary device.

Furthermore, in a case that the secondary device fails to execute the synchronization instruction correctly (for example, due to a network delay or a device malfunction) after receiving the synchronization instruction, it sends a failure report to the primary device. Upon receiving the failure report, the primary device can take appropriate remedial actions, such as resending the synchronization instruction or adjusting the playback strategy.

Step 206, calculating a clock difference of each channel between the primary audio device and each secondary audio device based on a response returned by each secondary audio device according to the synchronization instruction.

The calculation of the clock difference is actually obtained through a manner of timestamp exchange.

First, the primary device sends a synchronization message and records sending time T1.

Next, the secondary device receives the synchronization message and records receiving time T2.

Last, the secondary device responds, and the primary device records times T3 and T4.

Based on the above, the clock difference is $\Delta T=((T2-T1)-(T4-T3))/2$.

Step 207, playing the audio encoding sequence data packets in the corresponding secondary audio device based on a clock difference planning of each channel.

In this embodiment, the control of audio playback based on clock difference includes two ways: one is by adjusting a bandwidth resource, and the other is by setting a buffer.

The adjusting the bandwidth resource includes:
sorting, according to sizes of clock differences of the channels, the channels of each secondary audio device; where the channels include a front channel, a surrounding channel, and a bass channel;
calculating, according to a priority of bandwidth resource usage for each channel and the channel sorting, a weighted coefficient for each channel; and
calculating, based on the weighted coefficient and a bandwidth allocation bit rate formula, the bandwidth resource of each channel; where the front channel and the bass channel have the highest priority.

The bandwidth allocation bit rate formula is $$R_i = \frac{W_i * B}{\sum_{j=1}^{N} W_j},$$

where $R_i$ is a bit rate of an $i^{th}$ channel, $W_i$ is a weighted coefficient of the $i^{th}$ channel, B is the total bandwidth, and N is the total number of channels.

The setting the buffer includes: calculating, based on the clock difference of each channel, a size of buffered audio in the corresponding secondary audio device; setting, based on the size of the buffered audio, a corresponding buffer; and monitoring a state of the buffer where the audio encoding sequence data packets are stored, and after the buffer is completely occupied by the audio encoding sequence data packets, controlling the corresponding secondary audio device to play the audio encoding sequence data packets.

The setting, based on the size of the buffered audio, the corresponding buffer, includes: calculating, using a latency compensation algorithm, a size of the corresponding buffer based on the size of the buffered audio, where the size of the buffer is:

$B_2 = B_1 + r*\Delta T$ where $B_2$ is a size of the buffer after adjustment, $B_1$ is the current size of the buffer, $\Delta T$ is the clock difference, and r is an adjustment coefficient of the buffer.

In another possible embodiment, the method further includes:
subsequent to controlling the audio encoding sequence data packets to be synchronously played in at least one secondary audio device by using the preset room synchronization control strategy and the channel synchronization control strategy,
detecting whether a NACK response message exists;
determining a target secondary audio device based on the NACK response message in response to determining that the NACK response message exists, and polling and transmitting the audio encoding sequence data packets to the target secondary audio device according to the maximum quantity of retransmissions.

In the embodiments of this application, through innovatively combining the low latency LC3 encoding technology, the optimized UDP transmission mechanism, and the distributed synchronization strategy, it successfully addresses the issue of multi-room and multi-channel real-time audio synchronization. At the audio encoding layer, it adopts the LC3 encoding approach with the 2.5 ms ultra-short frame length, coupled with the parallel sub-frame processing mechanism, so as to control the total encoding and decoding latency within 1.5 ms, thereby achieving almost a 10 times performance improvement as compared with the traditional audio encoding approach. At the network transmission layer, through the well-designed NACK-based UDP reliable transmission mechanism, combined with selective redundant transmission and intelligent congestion control strategies, the network transmission delay is reduced by over 60% while ensuring transmission reliability. This application further innovatively introduces the PTP-based distributed clock synchronization mechanism and device-level synchronization control strategy, combined with the adaptive buffer management and dynamic delay compensation technologies, it successfully controls the audio synchronization difference between multiple devices to be within 1 ms. In multi-channel application scenarios, efficient bandwidth utilization is achieved through the channel grouping encoding and dynamic bit allocation strategy, while ensuring the audio quality of each channel. The system is also equipped with a comprehensive performance monitoring, fault recovery, and anomaly handling mechanism, thereby ensuring the stability and reliability of the solution in practical applications. Through the organic combination of these technological innovations, the system achieves excellent performance with an end-to-end delay as low as 70 ms, while ensuring outstanding audio quality and multi-device synchronization effects, thereby providing a comprehensive technical solution for the field of real-time audio communication. Particularly, in multi-channel application scenarios such as home theaters, this solution not only addresses the delay and synchronization issues of wireless speakers but also offers a more flexible deployment solution than the traditional wired system, significantly enhancing the user experience.

The above describes the multi-room multi-channel audio synchronization method in the embodiments of this application, and the following description illustrates a multi-room multi-channel audio synchronization apparatus in the embodiments of this application. Please refer to FIG. 3, the multi-room multi-channel audio synchronization apparatus according to the embodiments of this application, includes: an encoding module 310, configured to determine an audio signal to be played in a primary audio device, and encode the audio signal according to channels by using a preset low-latency audio encoding strategy and obtaining audio encoding data; an optimization module 320, configured to optimize, based on a User Datagram Protocol UDP and a Negative Acknowledgment NACK retransmission mechanism, the audio encoding data to obtain audio coded sequence data packets; and a transmission module 330, configured to control the audio encoding sequence data packets to be synchronously played in at least one secondary audio device by using a preset room synchronization control strategy and a channel synchronization control strategy; where the room synchronization control strategy is a synchronization strategy for clock synchronization of multiple audio devices based on a distributed clock synchronization mechanism and for clock synchronization between the primary audio device and at least one secondary audio device based on a Precision Time Protocol PTP; where the channel synchronization control strategy is a synchronization strategy for dynamically allocating audio transmission of each channel based on channel grouping.

In the embodiments of this application, an audio signal to be played in a primary audio device is determined, the audio signal is encoded according to channels by using a preset low-latency audio encoding strategy (Low Complexity Communications Codec (LC3)) and audio encoding data is obtained. Next, the audio encoding data is optimized based on a User Datagram Protocol UDP and a Negative Acknowledgment NACK retransmission mechanism to obtain audio coded sequence data packets. The audio encoding sequence data packets are controlled to be synchronously played in at least one secondary audio device by using a preset room synchronization control strategy and a channel synchronization control strategy. Therefore, it is able to address the issues of high audio delay and poor synchronization of the audio system in the prior art.

Figure 4:
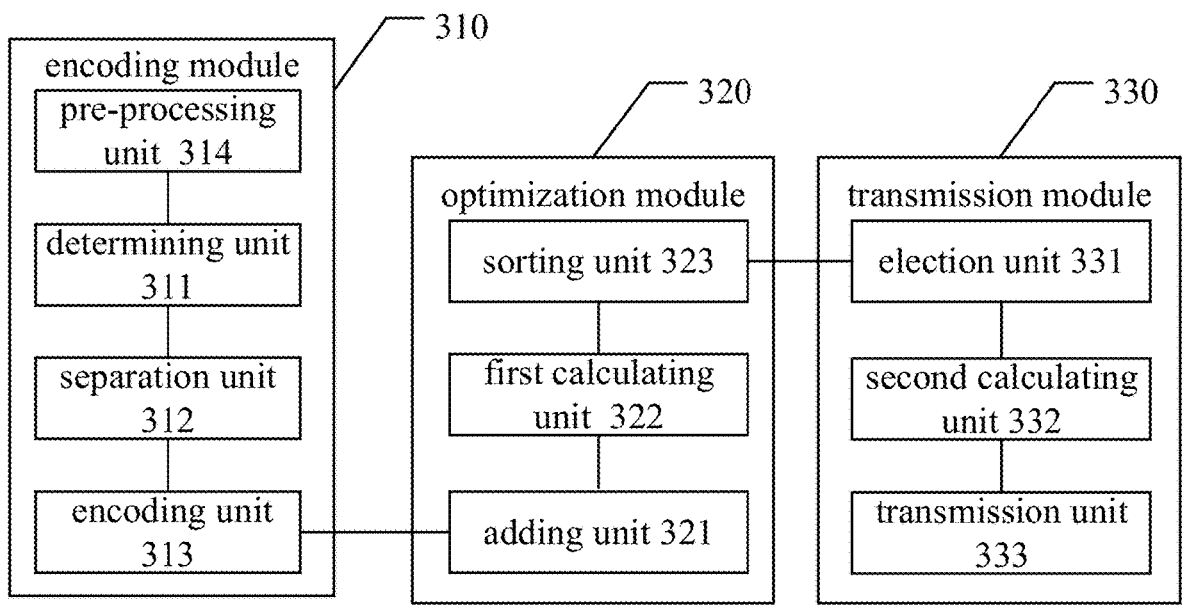
FIG. 4 is another schematic diagram of the multi-room multi-channel audio synchronization apparatus according to the embodiments of this application.

Please refer to FIG. 4, the multi-room multi-channel audio synchronization apparatus according to the embodiments of this application, includes: an encoding module 310, configured to determine an audio signal to be played in a primary audio device, and encode the audio signal according to channels by using a preset low-latency audio encoding strategy and obtaining audio encoding data; an optimization module 320, configured to optimize, based on a User Datagram Protocol UDP and a Negative Acknowledgment NACK retransmission mechanism, the audio encoding data to obtain audio coded sequence data packets; and a transmission module 330, configured to control the audio encoding sequence data packets to be synchronously played in at least one secondary audio device by using a preset room synchronization control strategy and a channel synchronization control strategy; where the room synchronization control strategy is a synchronization strategy for clock synchronization of multiple audio devices based on a distributed clock synchronization mechanism and for clock synchronization between the primary audio device and at least one secondary audio device based on a Precision Time Protocol PTP; where the channel synchronization control strategy is a synchronization strategy for dynamically allocating audio transmission of each channel based on channel grouping.

Optionally, the encoding module 310 includes:

a determining unit 311, configured to determine encoding parameters from the preset low-latency audio encoding strategy, where the encoding parameters include a frame length, a bit rate, and a sampling rate;

a separation unit 312, configured to separate the audio spectrum of each channel of the audio signal by using an audio processing tool, and obtain the plurality of channel audios; and an encoding unit 313, configured to encode, by using a Low Complexity Communications Codec LC3 encoder and parallel sub-frame processing mechanism, each channel audio according to the frame length, the bit rate, and the sampling rate, to obtain the audio coding data corresponding to the audio signal.

Optionally, the encoding unit 313 is specifically configured to:

perform frame-dividing processing on each channel audio based on the bit rate, the frame length, and the sampling rate to obtain the plurality of audio frame signals, where each of the audio frame signals has a length equal to the frame length and includes N sampling points, and the N sampling points are calculated based on the sampling rate; and control the LC3 encoder by using the parallel sub-frame processing mechanism to encode each of the audio frame signals and concatenate the audio frame signals, to obtain the audio coding data corresponding to the audio signal.

Optionally, the encoding module 310 further includes a pre-processing unit 314, configured to:

perform noise suppression on the audio signal by using an adaptive noise suppression algorithm;

perform acoustic echo cancellation on the printed audio signal by using an adaptive filtering algorithm; and perform normalization processing on the audio signal after the acoustic echo cancellation, and output the audio signal.

Optionally, the optimization module 320 includes:

an adding unit 321, configured to add, based on a packet format defined in the UDP, a packet header with a unique identifier to the audio encoding data of each of the audio frame signals, where the packet header includes a sequence number of a frame, timestamp, and a redundancy flag;

a first calculating unit 322, configured to calculate, by using the NACK retransmission mechanism and the sequence number, a maximum quantity of retransmissions of a corresponding audio frame signal, and add the maximum quantity of retransmissions and the NACK response flag to the audio encoding data of the audio frame signal; and a sorting unit 323, configured to sort the audio frame signals into which the packet header, the maximum quantity of retransmissions, and the NACK response flag are added, in chronological order to obtain the audio encoding sequence data packets.

Optionally, the transmission module 330 includes:

an election unit 331, configured to determine the primary audio device through mutually voting using an election mechanism, and control the primary audio device to send a synchronization instruction to a plurality of secondary audio devices, where the synchronization instruction includes timestamp information, and the timestamp information includes a sending time of the primary audio device and a receiving time at each secondary audio device;

a second calculating unit 332, configured to calculate a clock difference of each channel between the primary audio device and each secondary audio device based on a response returned by each secondary audio device according to the synchronization instruction; and a transmission unit 333, configured to play the audio encoding sequence data packets in the corresponding secondary audio device based on a clock difference planning of each channel.

Optionally, the transmission unit 333 is specifically configured to:

adjust, based on the clock difference of each channel, the bandwidth resource of each channel according to the priority allocation strategy of bandwidth resource; and send the audio encoding sequence data packets to the corresponding secondary audio device for playback based on the adjusted bandwidth resource.

Optionally, the transmission unit 333 is specifically configured to:

sort, according to sizes of clock differences of the channels, the channels of each secondary audio device; where the channels include a front channel, a surrounding channel, and a bass channel;

calculate, according to a priority of bandwidth resource usage for each channel and the channel sorting, a weighted coefficient for each channel; and calculate, based on the weighted coefficient and a bandwidth allocation bit rate formula, the bandwidth resource of each channel; where the front channel and the bass channel have the highest priority.

Optionally, the transmission unit 333 is specifically configured to:

calculate, based on the clock difference of each channel, a size of buffered audio in the corresponding secondary audio device;

set, based on the size of the buffered audio, a corresponding buffer; and monitor a state of the buffer where the audio encoding sequence data packets are stored, and after the buffer is completely occupied by the audio encoding sequence data packets, controlling the corresponding secondary audio device to play the audio encoding sequence data packets.

Optionally, the transmission unit 333 is specifically configured to:

calculate, using a latency compensation algorithm, a size of the corresponding buffer based on the size of the buffered audio, where the size of the buffer is:

$B_2 = B_1 + r*\Delta T$ where $B_2$ is a size of the buffer after adjustment, $B_1$ is the current size of the buffer, $\Delta T$ is the clock difference, and r is an adjustment coefficient of the buffer.

Optionally, the transmission unit 333 is specifically configured to:

detect whether a NACK response message exists;

determine a target secondary audio device based on the NACK response message in response to determining that the NACK response message exists, and poll and transmit the audio encoding sequence data packets to the target secondary audio device according to the maximum quantity of retransmissions.

In the embodiments of this application, the audio signal is encoded by using low-latency LC3 encoding to minimize transmission delay, and the encoded audio signal is transmitted by using the UDP protocol and NACK retransmission mechanism, which reduces network bandwidth occupancy while avoiding additional delays caused by transmission or retransmission.

Figure 3:
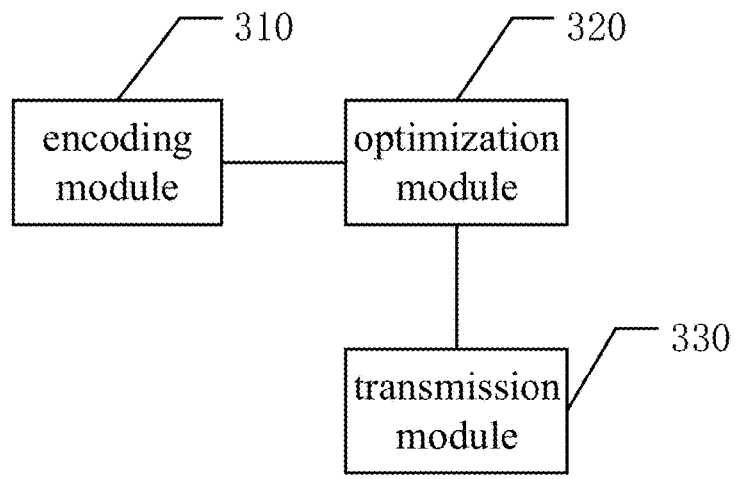
FIG. 3 is a schematic diagram of a multi-room multi-channel audio synchronization apparatus according to the embodiments of this application.

In FIG. 3 and FIG. 4, the multi-room multi-channel audio synchronization apparatus in the embodiments of this application is described in detail in the form of modular functional entities. An audio device in the embodiments of this application will be described hereinafter in the form of hardware processing.

Figure 5:
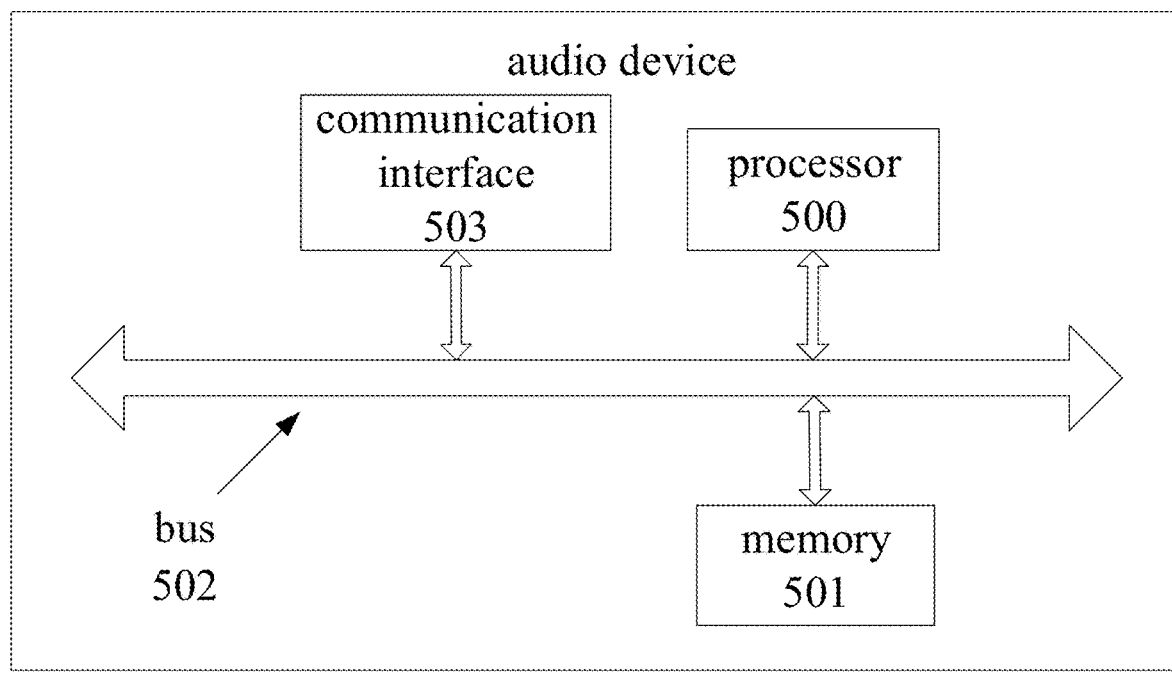
FIG. 5 is a schematic diagram of an audio device according to the embodiments of this application.

As shown in FIG. 5, the audio device includes a processor 500 and a memory 501. The memory 501 stores machine executable instructions that can be executed by the processor 500, the machine executable instructions, when executed by the processor 500, cause the processor 500 to implement the above multi-room multi-channel audio synchronization method.

Furthermore, the audio parameter adjustment device in FIG. 5 further includes a bus 502 and a communication interface 503, and the processor 500, the communication interface 503 and the memory 501 are connected via the bus 502.

The memory 501 may include a high-speed random access memory (RAM), or a non-volatile memory (non-volatile memory), for example, at least one disk storage. The communication connection between the system network element and at least one other network element is realized through at least one communication interface 503 (which may be wired or wireless), and the Internet, wide area network, local area network, metropolitan area network, etc. may be used. The bus 502 may be an Industry Standard Architecture (ISA) bus, a Peripheral Component Interconnect (PCI) bus, or an Extended Industry Standard Architecture (EISA) bus, etc. The bus may be categorized as an address bus, a data bus, a control bus, etc. For ease of representation, only one bidirectional arrow is used in FIG. 5, but it does not mean that there is only one bus or one type of bus.

The processor 500 may be an integrated circuit with signal processing capability. In the implementation process, the various steps of the above method may be implemented by an integrated logic circuit of the processor 500 in hardware form or implemented by instructions in the form of software in the processor 500. The processor 500 may be a general-purpose processor, including a central processing unit (CPU), a network processor (NP), etc. The processor 500 may also be a digital signal processor (DSP), an application specific integrated circuit (ASIC), a field programmable gate array (FPGA) or any other programmable logic device, discrete gate or transistor logic device, discrete hardware component. Various methods, steps and logic block diagrams in the embodiments of this application may be implemented or carried out. The general processor may be a micro-processor or any conventional processor, etc. The steps of the method in the embodiments of this application may be directly implemented by a hardware decoding processor, or implemented by a combination of hardware and software modules in the decoding processor. The software modules may be located in a storage medium well-known in the art, such as a random access memory, a flash memory, a read-only memory, a programmable read-only memory, or an electrically erasable programmable memory, a register. The storage medium is located in the memory 501, and the processor 500 reads the information in the memory 501 and finishes the method steps of the above-mentioned embodiment in combination with its hardware.

This application further provides an audio device, where a computer device includes a memory and a processor. The memory has stored thereon computer-readable instructions, which, when executed by the processor, cause the processor to perform the steps of the multi-room multi-channel audio synchronization method in the above embodiments.

This application further provides a computer-readable storage medium, which may be a non-volatile computer-readable storage medium or a volatile computer-readable storage medium. The computer-readable storage medium may be a volatile computer-readable storage medium having stored thereon instructions, the instructions, when executed on a computer, cause the computer to implement the steps of the above-mentioned multi-room multi-channel audio synchronization method.

Those skilled in the art may clearly understand that, for the sake of convenience and brevity of description, the specific working process of the system, apparatus and units mentioned above can refer to the corresponding processes in the method embodiments, which are not repeated herein.

If the integrated unit is implemented in the form of software functional units and sold or used as an independent product, it may be stored in a computer readable storage medium. Based on this understanding, essence of the technical solutions of this application, or the part contributing to the prior art, or all or part of the technical solutions, may be embodied in the form of a software product. The computer software product is stored in a storage medium, and includes a number of instructions to enable a computer device (which may be a personal computer, a server, or a network device, etc.) to perform all or part of the steps of method described in the various embodiments of this application. The storage medium includes a USB flash disk, a mobile hard disk, a read-only memory (Read-Only Memory, ROM), a random access memory (Random Access Memory, RAM), a magnetic disk, an optical disk, or other medium which can store program code.

The above embodiments are only used to illustrate the technical solutions of this application, but shall not be construed as limiting this application. As can be appreciated by a person skilled in the art, although this application has been described in detail with reference to the foregoing embodiments, any modifications or variations of the technical solutions in the aforementioned embodiments, or equivalent replacements of part of the technical features within the scope of the disclosed technology, may still be made by those skilled in the art. These modifications or replacements do not make the essence of the corresponding technical solutions depart from the spirit and scope of the technical solutions of the embodiments of this application.

What is claimed is:

1. A multi-room multi-channel audio synchronization method of a network device, comprising:
    determining an audio signal to be played in a primary audio device,
    encoding the audio signal according to channels by using a preset low-latency audio encoding strategy, and obtaining audio coding data;
    separating an audio spectrum of each of the channels of the audio signal to obtain a plurality of channel audios, and performing frame-dividing processing on each of the plurality of channel audios to obtain a plurality of audio frame signals;
    calculating a maximum quantity of retransmissions for each of the plurality of audio frame signals, and adding, based on a user datagram protocol (UDP), a packet header, the maximum quantity of retransmissions and a negative acknowledgment (NACK) response flag to each of the plurality of audio frame signals, and sorting the plurality of audio frame signals in chronological order to obtain audio encoding sequence data packets; and
    controlling the audio encoding sequence data packets to be synchronously played in at least one secondary audio device by using a preset room synchronization control strategy and a channel synchronization control strategy,
    wherein the preset room synchronization control strategy is a synchronization strategy for a clock synchronization of a plurality of audio devices including the at least one secondary audio device and at least one other secondary audio device based on a distributed clock synchronization mechanism and for a clock synchronization between the primary audio device and the plurality of audio devices based on a precision time protocol (PTP);
    wherein the channel synchronization control strategy is a synchronization strategy where a bandwidth resource of each of the channels is adjusted based on a clock difference of each of the channels according to a priority allocation strategy of the bandwidth resource to obtain an adjusted bandwidth resource, and the audio encoding sequence data packets are sent to a corresponding secondary audio device among the plurality of audio devices for playback based on the adjusted bandwidth resource.

2. The multi-room multi-channel audio synchronization method according to claim 1, wherein encoding the audio signal according to the channels by using the preset low-latency audio encoding strategy and obtaining the audio coding data comprise:
    determining encoding parameters from the preset low-latency audio encoding strategy, wherein the encoding parameters comprise a frame length, a bit rate and a sampling rate;
    separating the audio spectrum of each of the channels of the audio signal by using an audio processing tool, and obtaining the plurality of channel audios; and
    encoding, by using a low complexity communications codec (LC3) encoder and a parallel sub-frame processing mechanism, each of the plurality of channel audios according to the frame length, the bit rate and the sampling rate, to obtain the audio coding data corresponding to the audio signal.

3. The multi-room multi-channel audio synchronization method according to claim 2, wherein encoding, by using the LC3 encoder and the parallel sub-frame processing mechanism, each of the plurality of channel audios according to the frame length, the bit rate and the sampling rate, to obtain the audio coding data corresponding to the audio signal comprises:
    performing the frame-dividing processing on each of the plurality of channel audios based on the bit rate, the frame length and the sampling rate to obtain the plurality of audio frame signals, wherein each of the plurality of audio frame signals has a length equal to the frame length and comprises N sampling points, and the N sampling points are calculated based on the sampling rate; and
    controlling the LC3 encoder by using the parallel sub-frame processing mechanism to encode each of the plurality of audio frame signals and concatenate the plurality of audio frame signals, to obtain the audio coding data corresponding to the audio signal.

4. The multi-room multi-channel audio synchronization method according to claim 1, further comprising:
    subsequent to determining the audio signal to be played in the primary audio device, and prior to encoding the audio signal according to the channels by using the preset low-latency audio encoding strategy and obtaining the audio coding data, performing a noise suppression on the audio signal by using an adaptive noise suppression algorithm to obtain a printed audio signal;

performing an acoustic echo cancellation on the printed audio signal by using an adaptive filtering algorithm to obtain an audio signal after the acoustic echo cancellation; and performing normalization processing on the audio signal after the acoustic echo cancellation to obtain a normalized audio signal, and outputting the normalized audio signal.

5. The multi-room multi-channel audio synchronization method according to claim 3, wherein calculating the maximum quantity of retransmissions for each of the plurality of audio frame signals, and adding, based on the UDP, the packet header, the maximum quantity of retransmissions and the NACK response flag to each of the plurality of audio frame signals, and sorting the plurality of audio frame signals in the chronological order to obtain the audio encoding sequence data packets comprise:

adding, based on a packet format defined in the UDP, a packet header with a unique identifier to audio encoding data of each of the plurality of audio frame signals, wherein the packet header with the unique identifier comprises a sequence number of a frame, a timestamp and a redundancy flag;

calculating, by using an NACK retransmission mechanism and the sequence number of the frame, the maximum quantity of retransmissions of each of the plurality of audio frame signals, and adding the maximum quantity of retransmissions and the NACK response flag to the audio encoding data of each of the plurality of audio frame signals; and sorting the plurality of audio frame signals in the chronological order to obtain the audio encoding sequence data packets, wherein the packet header with the unique identifier, the maximum quantity of retransmissions and the NACK response flag are added into each of the plurality of audio frame signals.

6. The multi-room multi-channel audio synchronization method according to claim 1, wherein controlling the audio encoding sequence data packets to be synchronously played in the at least one secondary audio device by using the preset room synchronization control strategy and the channel synchronization control strategy comprises:

determining the primary audio device through mutually voting using an election mechanism, and controlling the primary audio device to send a synchronization instruction to a plurality of secondary audio devices including the at least one secondary audio device and the at least one other secondary audio device, wherein the synchronization instruction comprises timestamp information, and the timestamp information comprises a sending time of the primary audio device and a receiving time at each of the plurality of secondary audio devices;

calculating the clock difference of each of the channels between the primary audio device and each of the plurality of secondary audio devices based on a response returned by each of the plurality of secondary audio devices according to the synchronization instruction; and playing the audio encoding sequence data packets in the corresponding secondary audio device based on a clock difference planning of each of the channels.

7. The multi-room multi-channel audio synchronization method according to claim 6, wherein playing the audio encoding sequence data packets in the corresponding secondary audio device based on the clock difference planning of each of the channels comprises:

adjusting, based on the clock difference of each of the channels, the bandwidth resource of each of the channels according to the priority allocation strategy of the bandwidth resource to obtain the adjusted bandwidth resource; and sending the audio encoding sequence data packets to the corresponding secondary audio device for playback based on the adjusted bandwidth resource.

8. The multi-room multi-channel audio synchronization method according to claim 7, wherein adjusting, based on the clock difference of each of the channels, the bandwidth resource of each of the channels according to the priority allocation strategy of the bandwidth resource to obtain the adjusted bandwidth resource comprises:

sorting, according to sizes of the clock differences of the channels, the channels of each of the plurality of secondary audio devices to obtain a channel sorting; wherein the channels comprise a front channel, a surrounding channel and a bass channel;

calculating, according to a priority of bandwidth resource usage for each of the channels and the channel sorting, a weighted coefficient for each of the channels; and calculating, based on the weighted coefficient and a bandwidth allocation bit rate formula, the bandwidth resource of each of the channels; wherein the front channel and the bass channel have a highest priority.

9. The multi-room multi-channel audio synchronization method according to claim 6, wherein playing the audio encoding sequence data packets in the corresponding secondary audio device based on the clock difference planning of each of the channels comprises:

calculating, based on the clock difference of each of the channels, a size of buffered audio in the corresponding secondary audio device;

setting, based on the size of the buffered audio, a corresponding buffer; and monitoring a state of the buffer where the audio encoding sequence data packets are stored, and after the buffer is completely occupied by the audio encoding sequence data packets, controlling the corresponding secondary audio device to play the audio encoding sequence data packets.

10. The multi-room multi-channel audio synchronization method according to claim 9, wherein setting, based on the size of the buffered audio, the corresponding buffer comprises: calculating, using a latency compensation algorithm, a size of the corresponding buffer based on the size of the buffered audio, wherein the size of the buffer is: $B_2=B_1+r*\Delta T$, wherein $B_2$ is a size of the buffer after adjustment, $B_1$ is a current size of the buffer, $\Delta T$ is the clock difference, and r is an adjustment coefficient of the buffer.

11. The multi-room multi-channel audio synchronization method according to claim 5, further comprising:

subsequent to controlling the audio encoding sequence data packets to be synchronously played in the at least one secondary audio device by using the preset room synchronization control strategy and the channel synchronization control strategy, detecting whether an NACK response message exists;

determining a target secondary audio device based on the NACK response message in response to determining that the NACK response message exists, and polling and transmitting the audio encoding sequence data packets to the target secondary audio device according to the maximum quantity of retransmissions.

12. A multi-room multi-channel audio synchronization apparatus of a network device, comprising:
  an encoding module, configured to determine an audio signal to be played in a primary audio device, encode the audio signal according to channels by using a preset low-latency audio encoding strategy, and obtain audio coding data;
  an optimization module, configured to
  separate an audio spectrum of each of the channels of the audio signal to obtain a plurality of channel audios, and perform frame-dividing processing on each of the plurality of channel audios to obtain a plurality of audio frame signals;
  calculate a maximum quantity of retransmissions for each of the plurality of audio frame signals, and add, based on a UDP, a packet header, the maximum quantity of retransmissions and an NACK response flag to each of the plurality of audio frame signals, and sort the plurality of audio frame signals in chronological order to obtain audio encoding sequence data packets; and
  a transmission module, configured to control the audio encoding sequence data packets to be synchronously played in at least one secondary audio device by using a preset room synchronization control strategy and a channel synchronization control strategy,
  wherein the preset room synchronization control strategy is a synchronization strategy for a clock synchronization of a plurality of audio devices including the at least one secondary audio device and at least one other secondary audio device based on a distributed clock synchronization mechanism and for a clock synchronization between the primary audio device and the plurality of audio devices based on a PTP;
  wherein the channel synchronization control strategy is a synchronization strategy where a bandwidth resource of each of the channels is adjusted based on a clock difference of each of the channels according to a priority allocation strategy of the bandwidth resource to obtain an adjusted bandwidth resource, and the audio encoding sequence data packets are sent to a corresponding secondary audio device among the plurality of audio devices for playback based on the adjusted bandwidth resource.

13. An audio device, comprising: a memory and at least one processor, wherein the memory stores instructions, and the at least one processor calls the instructions in the memory to allow the audio device to perform the multi-room multi-channel audio synchronization method according to claim 1.

14. A non-transitory computer readable storage medium, storing instructions, wherein the instructions implement, when executed by a processor, the multi-room multi-channel audio synchronization method according to claim 1.

\* \* \* \* \*